United States Patent [19] [11] Patent Number: 6,058,071
Woodall et al. [45] Date of Patent: May 2, 2000

[54] MAGNETO-INDUCTIVE SUBMARINE COMMUNICATIONS SYSTEM AND BUOY

[75] Inventors: Robert Woodall, Lynn Haven; Felipe Garcia, Panama City; John Sojdehei, Panama City Beach, all of Fla.

[73] Assignee: The United States of America as represented by the Secretary of the Navy, Washington, D.C.

[21] Appl. No.: 09/135,316

[22] Filed: Aug. 10, 1998

[51] Int. Cl.⁷ ...................................................... H04B 1/59
[52] U.S. Cl. .............................................. 367/3; 367/134
[58] Field of Search .................................. 367/2, 3, 134; 342/22

[56] References Cited

U.S. PATENT DOCUMENTS 4,203,160   5/1980   Doherty ........................................ 367/2
4,458,248   7/1984   Lyasko ....................................... 455/40
5,452,262   9/1995   Hagerty ....................................... 367/6

FOREIGN PATENT DOCUMENTS 2163029A   2/1986   United Kingdom .

*Primary Examiner*—Ian J. Lobo
*Attorney, Agent, or Firm*—Harvey A. Gilbert; Donald G. Peck

[57] ABSTRACT

A magneto-inductive submarine communication system and buoy provide two-way signal communications between a submerged craft, such as a submarine and a remote command station that may be airborne, on the surface, or on land. A buoy released from the submarine and floating on the surface of the ocean and a satellite is included to complete the bidirectional communications. Messages and commands between the submerged craft and the buoy are communicated by magneto-inductive message signals and magneto-inductive command signals in the extremely low frequency (ELF) to very low frequency (VLF) range of less than 3000 Hz. Message and command communications between the buoy and the satellite (or aircraft, or helicopter, or surface ship), and the satellite to the station are transferred via radio frequency (RF) signals or laser emissions.

8 Claims, 3 Drawing Sheets

MAGNETO-INDUCTIVE SUBMARINE COMMUNICATIONS SYSTEM AND BUOY

CROSS REFERENCE TO RELATED APPLICATIONS

This is a continuation in part of copending U.S. patent applications entitled "Magneto-Inductively Controlled Limpet" by John Sojehei et al., U.S. Patent and Trademark Office Ser. No. 09/040,184 (NC 78,836), filed Feb. 17, 1998, "Magneto-Inductive Seismic Fence" by Robert Woodall et al., U.S. Pat. No. 5,969,608 filed Feb. 23, 1998, and "Magneto Inductive On-Command Fuze" by Felipe Garcia et al., U.S. Patent and Trademark Office Ser. No. 09/228,074 (NC 78,802), filed Jan. 5, 1999 and incorporates all references and information thereof by reference herein.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to underwater communications systems. In particular, this invention relates to two-way underwater communications between a buoy and submerged craft via magneto-inductive signals propagated in the extremely low frequency (ELF) to very low frequency (VLF) range and RF and laser emission links to other stations.

Current methods used to communicate between submarines and surface command locations are limited. Some submarines surface and transmit RF messages to orbiting satellites which in turn relay communications to command centers. Another communication method uses sonar signals to communicate short messages to a buoy that in turn relays the message to satellite using an RF link. Another communication method releases a cable tethered buoy to communicate RF signals from the submarine, through the cable, and to the buoy which are then transmitted to a satellite. Each of these methods has limitations and disadvantages.

Two way communications are possible when using a buoy tethered to a cable. However, this requires the submarine to remain close to the surface and fairly stationary to have reliable communications. Furthermore, this communication method makes the submarine noisy at the water's surface where it is susceptible to passive sonar detection. Because the submarine has to move close to the surface in order to tether a surfaced buoy, the submarine also is vulnerable to visual, RF, and LASER detection by satellite and other military surveillance craft. Additionally, since the submarine is continually tethered to the buoy, monitored transmissions from the buoy can be triangulated and, consequently, the location of the submarine is revealed.

Submarines that surface as they are communicating with one or more satellites, are vulnerable to many types of detection and surveillance. Submarines using sonar to communicate signals to untethered relay buoys may be detected by passive means. In addition, the signal clarity and baud rate of sonar transmissions also are limited by environmental factors, such as sea state, wave height, reverberation, and particulates, as well as water salinity, temperature and thermoclines. Use of sonar may shorten the rate and range of communication between buoys and submarines.

Thus, in accordance with this inventive concept, a need has been recognized in the state of the art for a buoy and system using magneto-inductive signals in the ELF to VLF range for two-way communications between a submarine and the buoy that is linked by RF or laser emissions to extend these communications to other stations and does not compromise the submarine's location.

SUMMARY OF THE INVENTION

The invention is directed to providing a transponder buoy responsive to receive magneto-inductive message signals in the ELF to VLF range from a marine source to transmit electromagnetic message signals to a remote station.

An object of the invention is to provide communications that do not compromise the location of a submerged craft.

Another object is to provide a transponder buoy for creating safe communications between a submarine and remote stations.

An object of the invention is to provide a buoy using magneto-inductive signals in the ELF to VLF range for two-way communications with a submerged craft.

An object of the invention is to provide a buoy using magneto-inductive signals in the ELF to VLF range for two-way communications between a submerged craft and the buoy that are linked by RF or laser emissions to other stations.

An object of the invention is to provide a system for two way communications between a submarine and a command center that does not require the submarine to surface, that does not require the submarine to remain tethered to a surface buoy, that does not require the submarine to be close to the surface to communicate, that does not require the submarine to remain stationary, or does not require the submarine to remain close to the buoy.

Another object of the invention is to provide a system and buoy for two way communications between a command center and submarine while the submarine travels to various depths and headings over and across sonar echo inducing terrain.

An object is to provide a system and buoy for communications between a submarine and a command center that avoids interference from environmental influences, such as salinity, wave height, particulate, water temperature, and thermocline, and different compositions and shapes of bottom terrain.

Another object is to provide a system and buoy for covert two way communications between a submarine and a command center that reduces the possibility of enemy detection.

Another object of the invention is to provide a system and buoy for two way communications between a submarine and a command center at data rates up to 150 baud.

Another object of the invention is to provide a system and buoy for two way communications between a submarine and a command center using magneto-inductive signals in the ELF to VLF range to penetrate air, water, and solid medium interfaces.

Another object is to provide a system using signals in the ELF to VLF range to self destruct the communications buoy.

These and other objects of the invention will become more readily apparent from the ensuing specification when taken in conjunction with the appended claims.

DESCRIPTION OF THE PREFERRED EMBODIMENT

Figure 1:
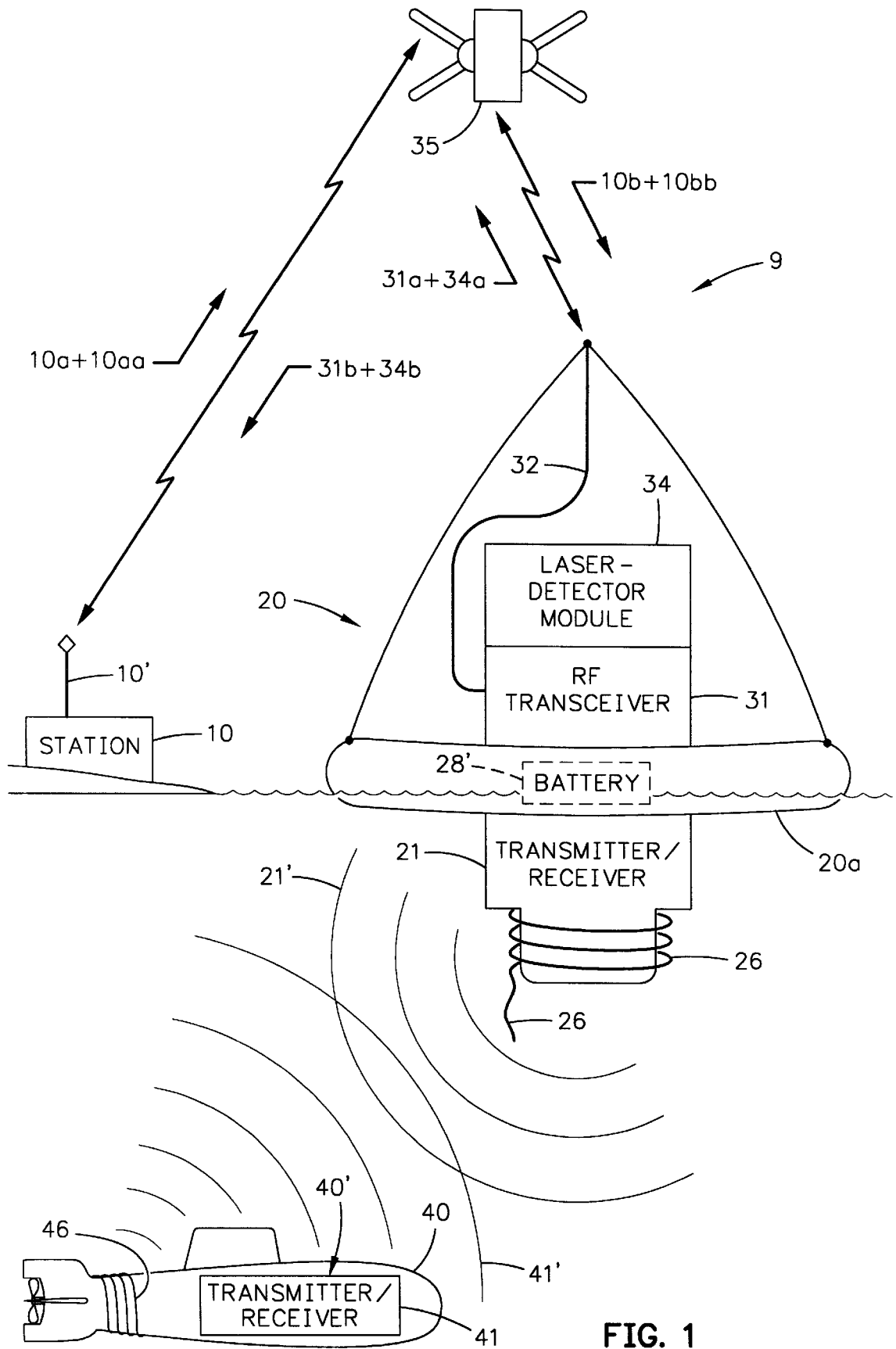
FIG. 1 schematically shows a system using magneto-inductive signals in the ELF to VLF range for two-way communications between a submerged craft and a buoy that are linked by RF and laser emissions to remote command centers.

Referring to FIG. 1 of the drawings, communication system 9 provides two way communications between a command center or station 10 and submersible 40, such as a submarine. Buoy 20 floats on the surface of the water after it has been ejected from a stowage compartment or torpedo tube on submarine 40, or it may dropped-off from other vessels or aircraft within a predetermined distance from submarine 40. Buoy 20 is ejected from submarine 40 and pressurized gas is vented into collar 20a attached to buoy 20. Collar 20a inflates and raises buoy 20 to the surface and may contain battery pack 28'.

Command center 10 is a remote station that communicates with submarine 40. Commands, or command signals, 10' from command center 10 are transmitted as RF command signals 10a or laser command emissions 10aa which may be sent directly to submarine 40, but are most likely sent to satellite 35. Satellite 35 relays RF command signals 10a and laser command emissions 10aa to buoy 20 as relayed RF command signals 10b and relayed laser command emissions 10bb to transceiver 31 and laser-detector module 34, respectively.

Buoy 20 operates as a transponder. It includes RF transceiver 31, laser-detector module 34 and magneto-inductive transmitter/receiver 21 with antenna 26.

Antenna 26 is designed to transmit and receive magneto-inductive signals in the ELF to VLF range and has windings that are air-cored or have steel or ferrite for field enhancement during transmission and reception. Antenna 26 is wrapped around buoy 20 which may have a metallic case to increase its magnetic moment by using its structure as a magnifying core, hangs in the water with parts of it extending above or below the water, or floats on the water to transmit and receive ELF and VLF signals.

Transmitter/receiver 21 of buoy 20 is connected to radio frequency (RF) transceiver 31 that is coupled to RF antenna 32 which extends into the air above buoy 20, and/or to laser-detector 34. Transceiver 31 transmits RF message signals 31a to at least one remote command center 10, or to satellite 35 which relays such signals to command center 10 as relayed RF message signals 31b. Transceiver 31 also receives RF command signals 10a from command center 10, or received relayed RF command signals 10b from satellite 35. The output of transmitter/receiver 21 could be fed to laser-detector module 34 to transmit laser message emissions 34a to command center 10, or to satellite 35 which relays such signals to command center 10 as relayed laser message emissions 34b. The detector components of laser-detector module 34 receive and/or demodulate laser command emissions 10aa from center 10 and relayed laser command emissions 10bb from satellite 35.

Submarine 40 is equipped with magneto-inductive transmitter/receiver 41 and antenna 46. Antenna 46 is designed to transmit and receive magneto-inductive signals in the ELF to VLF range and has windings that are air-cored or have steel or ferrite for field enhancement during transmission and reception. Antenna 46 may be wrapped about the hull of submarine 40 to increase its magnetic moment by using the structure of submarine 40 as a magnifying core, hangs in the water, rests inside a compartment inside submarine 40, or floats away from submarine 40, as desired.

Two-way communications between submarine 40 and buoy 20 occur when magneto-inductive transmitter/receiver 41 in submarine 40 transmits magneto-inductive message signals 41' from antenna 46 to antenna 26 of transmitter/receiver 21, and magneto-inductive transmitter/receiver 21 in buoy 20 transmits magneto-inductive command signals 21' from antenna 26 to antenna 46 of transmitter/receiver 41. These two-way communications may be coded for security and/or brevity.

Magneto-inductive communication with magneto-inductive signals uses the quasi-static AC magnetic field generated by a transmitting antenna operated with very low radiation impedance. Using magneto-inductive ELF to VLF communications in the 1–4000 Hz range assures transmission of message and command signals through water and air to other stations.

In this description, the designations, commands (or command signals) 10', RF command signals 10a, and laser command emissions 10aa are used to identify those signals that originate at and are sent from command centers (stations) 10, and message signals 40' and magneto-inductive message signals 41', are used to identify those signals that originate at and are sent from submarine 40. It is to be understood that commands (or command signals) 10', RF command signals 10a, and laser command emissions 10aa may also include other information items that are not necessarily commands, but may have other information content. Similarly, message signals 40' and magneto-inductive message signals 41' may also include other items that are not necessarily only informative but may be orders, for example.

Figure 2:
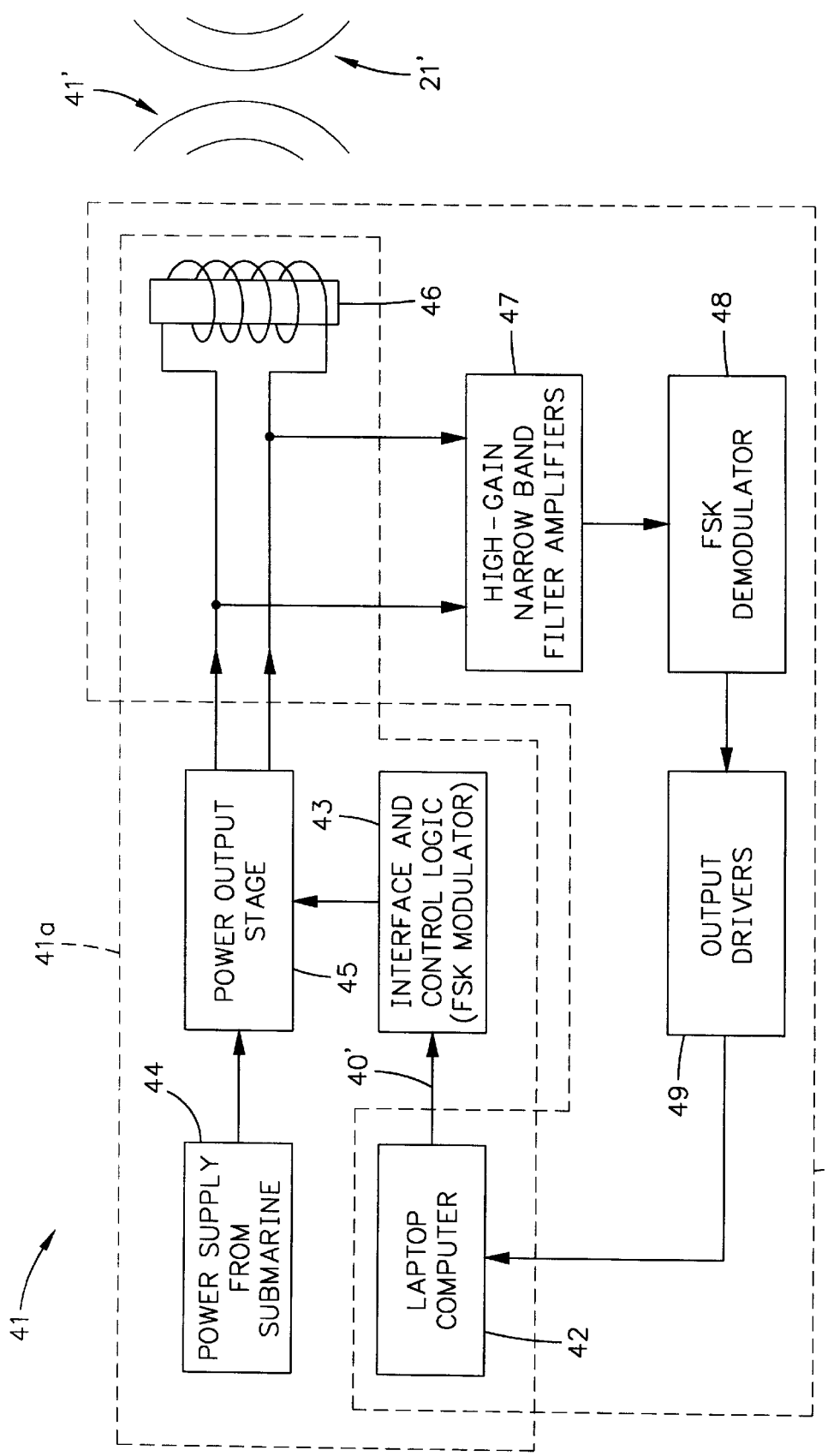
FIG. 2 shows components of the transmitter/receiver in the submerged craft.

FIG. 2 shows magneto-inductive transmitter/receiver 41 of submarine 40 having transmitter section 41a and receiver section 41b. Transmitter section 41a transmits digital message signals 40' that may be encrypted from a personal computer such as a laptop 42 via magneto-inductive message signals 41' in the ELF to VLF range to buoy 20. Receiver section 41b receives magneto-inductive command signals 21' in the ELF to VLF range from buoy 20 and displays the command data on laptop 42. Sections 41a and 41b of transmitter/receiver 41 use the same antenna 46 and laptop 42 for transmitted message signals 40' and received commands 10'.

Transmitter section 41a has interface and control logic module 43 coupled to laptop 42, power supply 44 from submarine 40, and transmitter power output stage 45 connected to power supply 44 and antenna 46. Laptop computer 42 is connected to interface and control logic module 43 via an RS-232 serial port. When an operator in submarine 40 sends message 40' from laptop 42, the program running on laptop 42 may encrypt message 40' and pass it to interface and control logic module 43 from the serial port of laptop 42. Module 43 converts message signals 40' to ELF to VLF frequencies modulated by frequency shift keying (FSK).

FSK, in general, is a form of frequency modulation in which the modulating wave shifts the output between two predetermined frequencies usually termed mark and space frequencies. It is an FM system in which the carrier frequency (about 760 Hz) is midway between the mark and space frequencies and is modulated by a rectangular wave. Mark causes the carrier frequency to increase by a predetermined amount and space results in a decrease of the carrier frequency by this amount. Thus, transmitted magneto-inductive message signals 41' change by the differences between mark and space frequencies as they are keyed.

Power supply 44 from onboard submarine 40 drives power output stage module 45. Power supply 44 also powers other parts of transmitter/receiver 41; however, these connections are not shown to simplify the drawings. Power output stage module 45 uses power MOSFET drivers to drive antenna 46 to transmit FSK modulations as magneto-inductive message signals 41' in the ELF to VLF frequency range.

Receiver section 41b on submarine 40 receives magneto-inductive command signals 21' in the ELF to VLF range on antenna 46 and couples them to a series of two high gain narrow band filter amplifiers 47 coupled in a single superheterodyne configuration to minimize internal noise of the circuit and maintain very high gain. The output of amplifiers 47 is fed to FSK demodulator 48 to separate the information of command signals 21' from the carrier frequency. The demodulator function of demodulator 48 is implemented by a phase locked loop (PLL) to detect the original modulated command signal. As the modulated signal appears at the PLL input, the PLL locks to the input frequency and tracks it between the two frequencies. PLL output signals are corresponding voltage levels necessary to reconstruct the original transmitted command data, which was sent by buoy 20. The output of PLL is sent to output drivers 49 to convert transistor-transistor logic output of demodulator 48 to appropriate voltages which are coupled to serial port RS-232 of laptop 42. The software running on laptop 42 decodes the encrypted command message to its original form for display and appropriate action onboard submarine 40.

Transmitter/receiver 21 on buoy 20 has receiver portion 21a which is used to receive message signals 40' in the form of magneto-inductive message signals 41' in the ELF to VLF range from submarine 40. The received message signals 40' are sent by RF transceiver 31 or laser-detector 34 to satellite 35 as RF message signals 31a or laser message emissions 34a, respectively. Satellite 35 relays the received message signals 40' as relayed RF message signals 31b or relayed laser message emissions 34b to command center 10, which might also include other stations such as surface ship(s), helicopter(s), or aircraft(s).

RF transceiver 31 or laser-detector module 34 of transmitter/receiver 21 also receives RF command signals 10a or laser command emissions 10aa from command center 10. These RF command signals 10a or laser command emissions 10aa may have been relayed from satellite 35 as relayed RF command signals 10b or relayed laser command emissions 10bb. In either form, commands 10' thereby are fed from transceiver 31 or laser-detector module 34 to transmitter portion 21b which transmits the information of commands 10' to submarine 40 as magneto-inductive command signals 21' in the ELF to VLF range.

Figure 3:
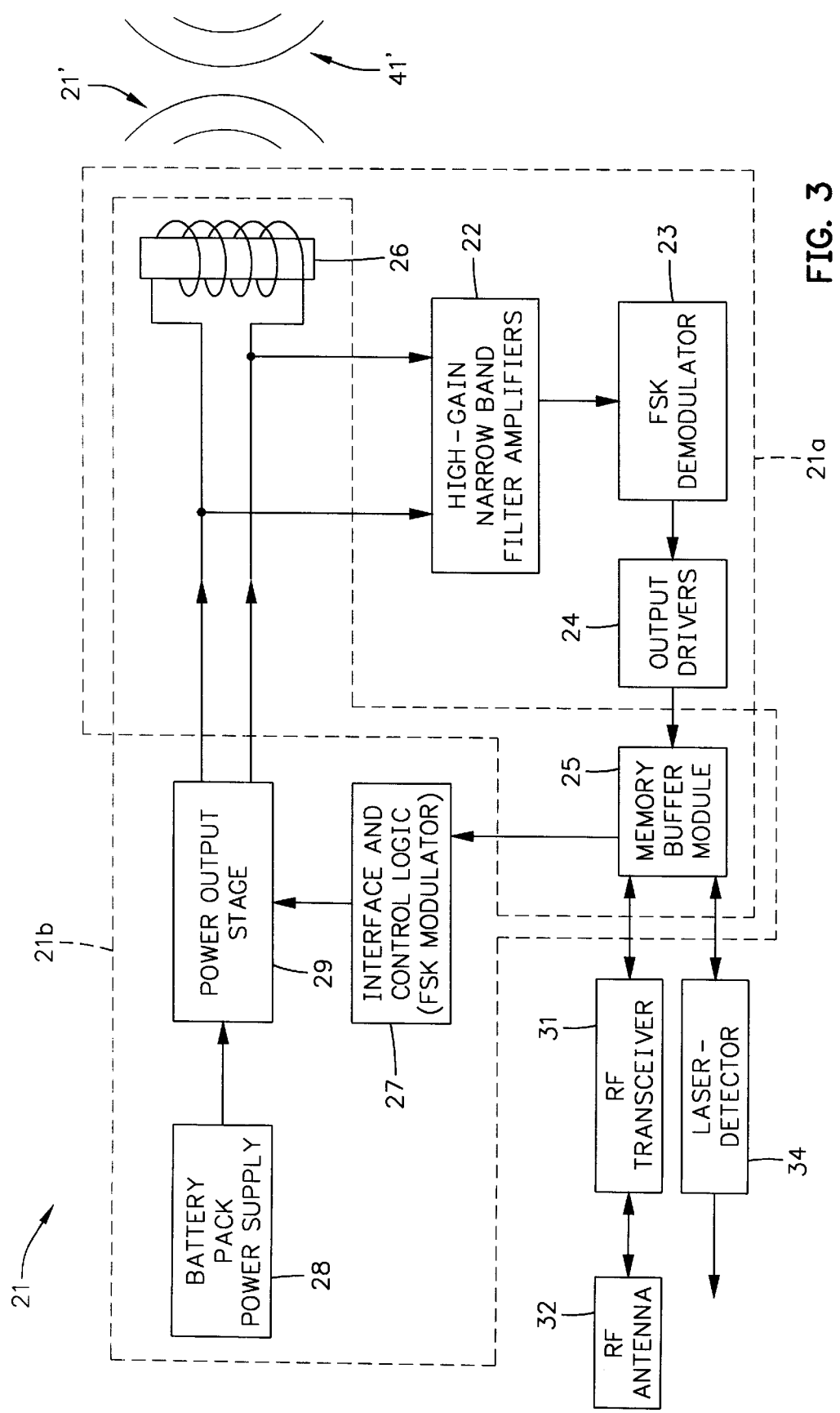
FIG. 3 shows the components of the buoy that uses magneto-inductive signals in the ELF to VLF range and RF signals or laser emissions for two-way communications.

Referring to FIG. 3, magneto-inductive antenna 26 of receiver portion 21a of transmitter/receiver 21 receives magneto-inductive message signals 41' and feeds them to two high gain narrow band filter amplifiers 22. Amplifiers 22 are coupled in a single superheterodyne configuration, and their output is connected to FSK demodulator module 23 to separate message signals 40' from the carrier frequency. These components and their operation are virtually identical with respect to the corresponding components of receiver section 41b in submarine 40, which have been described above with the exception that different frequencies are used here, i.e., magneto-inductive message signals 41' as compared to magneto-inductive command signals 21'.

The output of the phase locked loop (PLL) of demodulator module 23 is sent to receiver output drivers 24. The output from drivers 24 is coupled to memory buffer 25 to temporarily store the message information prior to relaying it via RF message signals 31a from RF transceiver 31 or laser message emissions 34a from laser-detector module 34.

RF transceiver 31 or laser-detector module 34 on buoy 20 receives commands 10' from command centers 10 as RF command signals 10a or laser command emissions 10aa and feeds these commands 10' to transmitter portion 21b. These commands 10' may have been relayed from satellite 35 to RF transceiver 31 or laser-detector module 34 as relayed RF command signals 10b or relayed laser command emissions 10bb. The received commands 10' are coupled to buffer module 25.

Buffer module 25 temporarily stores command signals 10' received from transceiver 31 and laser-detector module 34. Other parts of transmitter portion 21b that are used to process commands 10' are interface and control logic module 27, power supply 28, transmitter power output stage 29, and antenna 26.

Interface and control logic module 27 in transmitter portion 21b is coupled to memory buffer module 25, and transmitter power output stage 29 is connected to power supply 28 and antenna 26. Buffer module 25 has the stored command signals 10' which are sent to interface and control logic module 27. Module 27 receives the information of command signals 10' and modulates a carrier frequency of about 760 Hz using FSK modulation to create magneto-inductive command signals 21 in the ELF to VLF range. These magneto-inductive command signals 21' in the ELF to VLF range are transmitted to submarine 40 by power output stage 29 and antenna 26. These components and their operation are virtually identical with respect to the corresponding components of transmitter section 41a in submarine 40 which have been described above with the exception that different frequencies are used, i.e., magneto-inductive command signals 21' instead of magneto-inductive message signals 41'.

Power supply 28 may derive its power from battery pack 28' on buoy 20. Battery pack 28' may be contained in collar 20a and is activated as buoy 20 is brought to the surface when collar 20a inflates. Power supply 28 supplies power output stage 29 and also feeds power to other parts of transmitter/receiver 21, transceiver 31, and laser-detector 34. Power output stage 29 uses power MOSFET drivers to drive antenna 26 so that magneto-inductive command signals 21' in the ELF to VLF frequency range are transmitted to submarine 40.

In operation, when submarine 40 is submerged and an operator needs to communicate information to command center 10, buoy 20 is released or ejected from submarine 40. Flotation collar 20a on buoy 20 inflates with compressed gas, and buoy 20 is raised to the surface of the ocean. Meanwhile, battery pack 28' of thermal lithium batteries might be activated to function as power supply 28 for transmitter/receiver 21, transceiver 31 and laser-detector module 34. Consequently, buoy 20 may be able to transpond signals shortly after it surfaces.

Buoy 20 may additionally have a logic module, not shown, coupled to antenna 26. This module responds to specifically encoded magneto-inductive transmissions from submarine 40 to initiate a squib. The squib detonates an explosive to self-destruct or scuttle buoy 20 when it is no longer needed.

To transmit message signals 40' from submarine 40 to command center 10, an operator feeds message signals 40' from laptop 42 of transmitter section 41a of transmitter/ receiver 41 to interface and control logic 43. The coded and encrypted message is transmitted as magneto-inductive message signals 41' in the VLF to ELF range from magneto-inductive tuned antenna 46 wrapped about the hull of submarine 40. Magneto-inductive message signals 41' travel through the water and reach magneto-inductive tuned antenna 26 on buoy 20. Signals 41' are received and demodulated by receiver portion 21a on buoy 20 which then transmits the encrypted message as RF message signals 31a from transceiver 31 or laser message emissions 34a from laser-detector module 34. Either way, the encrypted message reaches satellite 35 where it is relayed as relayed RF message signals 31b or relayed laser message emissions 34b to remote command centers 10.

Command center 10 communicates with submarine 40 by sending encrypted command messages 10' by RF command signals 10a or laser command emissions 10aa to satellite 35 which relays them to buoy 20 as relayed RF command signals 10b or relayed laser command emissions 10bb. RF transceiver 31 or laser-detector module 34 on buoy 20 receives these RF command signals or laser command emissions and passes these command signals 10' to transmitter portion 21b of transmitter/receiver 21. The encrypted command message signals 10' are stored in buffer module 25 of transmitter portion 21b and transmitted as magneto-inductive command signals 21' in the ELF to VLF range from transmitter portion 21b via antenna 26. These magneto-inductive command signals 21' are received by antenna 46 on submarine 40, coupled to receiver section 41b, and decoded for appropriate action.

System 9 and buoy 20 of this invention assure two-way communications between submarine 40 and command center 10 without requiring submarine 40 to surface, to remain tethered to a surface buoy, to remain close to a buoy, to move close to the surface in order to communicate, or to remain stationary. System 9 and buoy 20 of this invention provide two-way communications between submarine 40 and command center 10 and still allow submarine 40 to travel to various depths and headings, or to pass freely near sonar echo inducing terrain, and to have freedom from interference caused by environmental influences such as salinity, wave height, particulates, water temperature and thermoclines. This capability is not compromised by bottom terrain composition and shape. System 9 and buoy 20 of this invention permit two-way communications between submarine 40 and command center 10 in a covert manner at data rates up to 150 baud to reduce the chances of enemy detection and to allow the submarine to have near instant communications access to the command station. System 9 and buoy 20 of this invention assure two-way communication between submarine 40 and command center 10 using ELF and near VLF frequencies to reliably communicate through air, water, and solid medium interfaces. Upon receipt of one sequence of magneto-inductive signals, a self destruct mechanism inside buoy 20 scuttles or destroys it to prevent recovery by others.

The disclosed components and operation as disclosed herein all contribute to the novel features of this invention. These novel features assure safety and more reliable bidirectional communications between submarine 40 and command center 10 to successfully complete the mission. The components of transmitter/receiver 41 and buoy 20 are capable of being tailored for a wide variety of different tasks, yet such modifications are within the scope of this invention. For example, different antenna configurations, different combinations of frequencies in the ELF to VLF range, different power supplies, data rates, and/or different modulation techniques could be chosen for other applications without departing from the scope of this invention.

Furthermore, having this disclosure in mind, one skilled in the art to which this invention pertains will select and assemble suitable components for buoy 20 and transmitter/receiver 41 from among a wide variety available in the art and appropriately interconnect them to satisfactorily function as disclosed. Therefore, this disclosure is not to be construed as limiting, but rather, is intended to demonstrate this inventive concept.

It should be readily understood that many modifications and variations of the present invention are possible within the purview of the claimed invention. It is to be understood that within the scope of the appended claims the invention may be practiced otherwise than as specifically described.

We claim:

1. A transponder buoy responsive to receive magneto-inductive message signals in the ELF to VLF range from a marine source to transmit electromagnetic message signals to a remote station and responsive to receive electromagnetic command signals from a remote station to transmit magneto-inductive command signals in the ELF to VLF range, said buoy having an RF transceiver and laser-detector module responsive to transmit said electromagnetic message signals as RF message signals and laser message emissions, respectively, and to receive said electromagnetic command signals as RF command signals and laser command emissions, respectively, said buoy further having a receiver portion coupled to an antenna to receive said magneto-inductive message signals and a transmitter portion coupled to said antenna to transmit said magneto-inductive command signals, said receiver portion having high gain narrow band filter amplifiers receiving said magneto-inductive message signals, an FSK demodulator module coupled to said high gain narrow band filter amplifiers, output drivers coupled to said demodulator module, and memory buffer module, said filter amplifiers being connected as a single superheterodyne to minimize internal noise and maintain very high gain, said demodulator module detecting amplitude modulation of a carrier frequency of said magneto-inductive message signals, and said memory buffer module temporarily storing the information of said magneto-inductive message signals prior to transmitting it from said RF transceiver and said laser-detector module.

2. A transponder buoy according to claim 1 in which said transmitter portion includes said memory buffer module to temporarily store the command signals received by said RF transceiver and said laser-detector module, an interface and control logic module connected to said memory buffer module to encode said command signals and frequency-shift-key modulate a carrier frequency in the ELF to VLF range, and a power output stage to transmit said magneto-inductive command signals from said antenna.

3. A system for two way communications between a submersible and a remote station comprising:

a transmitter-receiver in a submersible having a transmitter section coupled to a submersible antenna to transmit magneto-inductive message signals in the ELF to VLF range and a receiver section coupled to said submersible antenna to receive magneto-inductive command signals in the ELF to VLF range, said transmitter section having a laptop computer to designate a command signal, an interface and control logic module coupled to said laptop to encode a designated command signal by frequency shift keying a carrier frequency in the ELF to VLF range, and a power output stage connected to said interface and control logic module to transmit said magneto-inductive command signals via said submersible antenna, said receiver section having high gain narrow band filter amplifiers being connected as a superheterodyne to minimize internal noise and maintain very high gain, an FSK demodulator coupled to said amplifiers to separate command information from said magneto-inductive command signals, and output drivers coupled to said demodulator and said laptop to display said commands; and a buoy being responsive to RF command signals to transmit said magneto-inductive command signals and being responsive to said magneto-inductive message signals to transmit RF message signals, said buoy having a receiver portion coupled to a buoy antenna to receive said magneto-inductive message signals and a transmitter portion coupled to said buoy antenna to transmit said magneto-inductive command signals, said buoy further being responsive to laser command emissions to transmit said magneto-inductive command signals and being responsive to said magneto-inductive message signals to transmit laser message emissions.

4. A system according to claim 3 further including:

a satellite responsive to said RF message signals and laser message emissions to relay them to a remote station and to said RF command signals and laser command emissions from a station to relay them to said buoy.

5. A system according to claim 4 in which said receiver portion of said buoy includes buoy high gain narrow band filter amplifiers, buoy FSK demodulator module coupled to said buoy amplifiers, buoy output drivers coupled to said buoy demodulator module, and a buoy memory buffer module.

6. A system according to claim 5 in which said buoy amplifiers are connected as a single superheterodyne to minimize internal noise and maintain very high gain, said buoy demodulator module separates the information from said magneto-inductive message signals, and said buoy output drivers are coupled to said buoy buffer module to temporarily store the information.

7. A system according to claim 6 in which said transmitter portion of said buoy includes said buoy buffer module, buoy interface and control logic module connected to said buoy buffer module, and a buoy power output stage coupled to said buoy interface and control logic module.

8. A system according to claim 7 in which said buoy buffer module provides said command signals, said buoy interface and control logic module encodes said command signals and frequency shift keys a carrier frequency in the ELF to VLF range, and said buoy power output stage transmits said magneto-inductive command signals via said buoy antenna.

* * * * *